(12) United States Patent
Ogawa et al.

(10) Patent No.: US 9,303,114 B2
(45) Date of Patent: *Apr. 5, 2016

(54) ONE LIQUID TYPE CYANATE ESTER-EPOXY COMPOSITE RESIN COMPOSITION

(75) Inventors: Ryo Ogawa, Saitama (JP); Shinsuke Yamada, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 957 days.

This patent is subject to a terminal disclaimer.

(21) Appl. No.: 13/203,586

(22) PCT Filed: Nov. 19, 2009

(86) PCT No.: PCT/JP2009/006225
§ 371 (c)(1),
(2), (4) Date: Jan. 30, 2012

(87) PCT Pub. No.: WO2010/086932
PCT Pub. Date: Aug. 5, 2010

(65) Prior Publication Data
US 2012/0123082 A1 May 17, 2012

(30) Foreign Application Priority Data
Jan. 29, 2009 (JP) .................................. 2009-017610

(51) Int. Cl.
| | | |
|---|---|---|
| *C08L 63/00* | (2006.01) | |
| *C08G 59/14* | (2006.01) | |
| *C08G 18/00* | (2006.01) | |
| *C08G 65/40* | (2006.01) | |
| *C08G 65/38* | (2006.01) | |
| *C08G 75/00* | (2006.01) | |
| *C08G 73/00* | (2006.01) | |
| *C08G 59/18* | (2006.01) | |
| *C08G 59/40* | (2006.01) | |
| *C09J 163/00* | (2006.01) | |

(52) U.S. Cl.
CPC .......... *C08G 59/184* (2013.01); *C08G 59/4007* (2013.01); *C08G 59/4014* (2013.01); *C08L 63/00* (2013.01); *C09J 163/00* (2013.01); *C08G 2650/50* (2013.01)

(58) Field of Classification Search
CPC ...................................................... C08G 59/184
USPC ........................................................... 525/523
See application file for complete search history.

(56) References Cited

U.S. PATENT DOCUMENTS

| | | | | |
|---|---|---|---|---|
| 5,025,100 | A * | 6/1991 | Lin et al. ........................ | 549/551 |
| 5,604,269 | A | 2/1997 | Papalos et al. | |
| 5,623,046 | A | 4/1997 | Papalos et al. | |
| 6,380,344 | B1 * | 4/2002 | Hayashi et al. ............... | 528/124 |
| 2008/0200636 | A1 * | 8/2008 | Nakanishi et al. ............ | 528/105 |
| 2008/0255271 | A1 * | 10/2008 | Raymond ...................... | 523/437 |

FOREIGN PATENT DOCUMENTS

| | | |
|---|---|---|
| EP | 1 270 635 A1 | 1/2003 |
| JP | 6-179801 A | 6/1994 |
| JP | 9-510481 A | 10/1997 |
| JP | 2003-40976 A | 2/2003 |
| JP | 2008-214567 A | 9/2008 |
| WO | WO 2009/001658 A1 | 12/2008 |

OTHER PUBLICATIONS

Fujita, Yusuke, JP 2008-214567 A machine-generated English translation, Sep. 18, 2008.*
International Search Report of PCT/JP2009/006225 (Jan. 7, 2010).

* cited by examiner

*Primary Examiner* — David Karst
(74) *Attorney, Agent, or Firm* — Millen, White, Zelano, Branigan, P.C.

(57) ABSTRACT

The present invention discloses one liquid type cyanate ester-epoxy composite resin composition comprised of (A) cyanate ester resin, (B) epoxy resin and (C) latent curing agent. The present one liquid type cyanate ester-epoxy composite resin composition is characterized in that the above (C) latent curing agent is comprised of a modified amine (a), which has one or more amino group having active hydrogen within a molecule, obtained by a reaction of a polyamine compound (a-1) with an epoxy compound (a-2), and a phenol resin (b), and that the above polyamine compound (a-1) is a polyether polyamine compound and/or the above epoxy compound (a-2) is a polyether polyepoxy compound.

17 Claims, No Drawings

ONE LIQUID TYPE CYANATE ESTER-EPOXY COMPOSITE RESIN COMPOSITION

FIELD OF THE INVENTION

The present invention relates to cyanate ester-epoxy composite resin composition, particularly to one liquid type cyanate ester-epoxy composite resin composition comprised of cyanate ester resin, epoxy resin and specific latent curing agent and having excellent low temperature curing properties and thermal resistance as well as excellent storage stability.

BACK GROUND OF THE INVENTION

An epoxy resin composition has excellent electric performance and adhesive strength. Therefore, it has been used for various electric fields and electronic fields in the past.

In a case where a sufficient thermal resistance properties can not be obtained even when using an conventional epoxy resin alone or by mixture, a high thermal resistant cyanate-epoxy composite resin compositions obtained by mixing epoxy resin with cyanate ester resin are commonly used as sealing materials of semiconductors or used for moldings.

As the above composite resin composition, liquid epoxy resin compositions used for sealing semiconductors comprised of, for example, cyanate ester, epoxy resin, inorganic filler and dihydrazide compound etc. are proposed. However, in this case, curing agents against cyanate ester and epoxy resin are required respectively, and also a high curing temperature and long curing time are required, which are disadvantages (for example, Patent document 1). Thus, a composite resin composition having satisfactory performance has not been obtained yet. In addition, it is proposed that an amine type curing agent is used for the composite composition which contains cyanate ester and epoxy resin. However, in this case, sufficient storage stability is not obtained (for example, Patent document 2).

On the other hand, as an example of using a latent curing agent, a thermosetting resin composition using a latent curing agent, which contains imidazole component, together with cyanate ester and epoxy resin is proposed (for example, Patent document 3). However, in this case, the amount of cyanate ester used should be limited to obtain sufficient stability, which is a disadvantage. Thus, a satisfactory composition has not been obtained yet.

PRIOR ART DOCUMENTS

Patent Documents

Patent document 1: Japanese Unexamined Patent Publication Tokkai 2001-302767
Patent document 2: Japanese Unexamined Patent Publication Tokkai-sho 60-250026
Patent document 3: Japanese Unexamined Patent Publication Toku hyo 2001-506313

SUMMARY OF THE INVENTION

Problems to be Solved by the Invention

Therefore, the object of the present invention is to provide cyanate ester-epoxy composite resin composition, which is obtained by combining cyanate ester resin with epoxy resin, having high thermal resistance as well as excellent storage stability and curing properties.

Means to Solve the Problems

As a result of extensive studies, the inventors of the present invention found that the above object can be accomplished by cyanate ester-epoxy composite resin composition comprised of a cyanate ester resin, an epoxy resin and a specific latent curing agent, thereby achieving the present invention.

Namely, the present invention is one liquid type cyanate ester-epoxy composite resin composition comprised of (A) cyanate ester resin, (B) epoxy resin and (C) latent curing agent, wherein the above latent curing agent is comprised of a modified amine (a), which has one or more amino group having active hydrogen within a molecule, obtained by a reaction of a polyamine compound (a-1) with an epoxy compound (a-2), and a phenol resin (b), characterized in that the above polyamine compound (a-1) is a polyether polyamine compound and/or the above epoxy compound (a-2) is a polyether polyepoxy compound, cured materials characterized in that it is obtained by polymerization-curing of the said composite resin composition, and also sealing materials and adhesive agents characterized by comprising the said composite resin composition, and further a method for manufacturing cured materials characterized in that the said composite resin composition is cured in the mold.

Effect of the Invention

One liquid type cyanate ester-epoxy composite resin composition having excellent low temperature curing properties and thermal resistance as well as excellent storage stability can be obtained by the present invention.

EMBODIMENTS FOR CARRYING OUT THE INVENTION

One liquid type cyanate ester-epoxy composite resin composition of the present invention is comprised of (A) cyanate ester resin, (B) epoxy resin and (C) latent curing agent, wherein the said (C) latent curing agent is comprised of (a) modified amine having one or more amino groups having active hydrogen within a molecule and (b) phenol resin. The present invention is characterized in that the above (a) modified amine is a modified amine obtained by reacting (a-1) polyamine compound with (a-2) epoxy compound and also the above (a-1) polyamine compound is a polyether polyamine compound and/or the above (a-2) epoxy compound is a polyether polyepoxy compound.

The (A) cyanate ester resin in the one liquid type cyanate ester-epoxy composite resin composition of the present invention is not limited in particular. However, it is preferable to be at least one kind selected from a group consisting of compounds represented by the following general formulae (1), (2), and prepolymers wherein a part of cyanate group in these compounds forms a triazine ring.

$$N\!\!\equiv\!\!C\!-\!O\!-\!R^2\!-\!R^1\!-\!R^3\!-\!O\!-\!C\!\!\equiv\!\!N \qquad \text{General formula (1)}$$

$R^1$ in the formula is an unsubstituted or fluorine-substituted bivalent hydrocarbon group, or represents —O—, —S—, or a single bond. $R^2$ and $R^3$ are independently an unsubstituted phenylene group or a phenylene group substituted by 1-4 alkyl groups.

General formula (2)

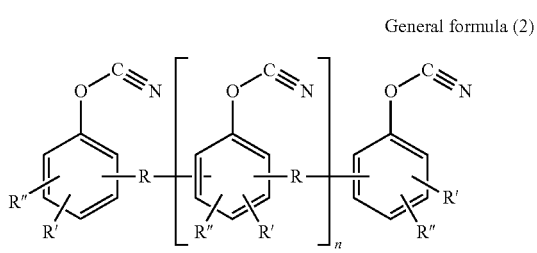

n in the above formula is a number of 1 or more, R is an unsubstituted or fluorine-substituted bivalent hydrocarbon group, R' and R" are a hydrogen atom or an alkyl group having 1-4 carbon atoms.

Furthermore, examples of the said prepolymer are trimers of all parts or a part of the compounds represented by the above formula (1).

It is preferable in particular to use at least one kind selected from a group consisting of compounds represented by the following general formula (3), and prepolymers thereof.

General formula (3)

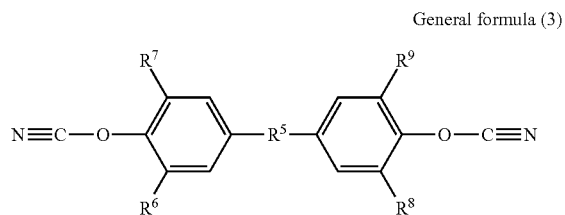

$R^6$, $R^7$, $R^8$ and $R^9$ are each a hydrogen atom or an unsubstituted or fluorine-substituted methyl group independently. $R^5$ is —O—, —S—, a single bond or a group represented by any formula in the following (3a).

(3a)

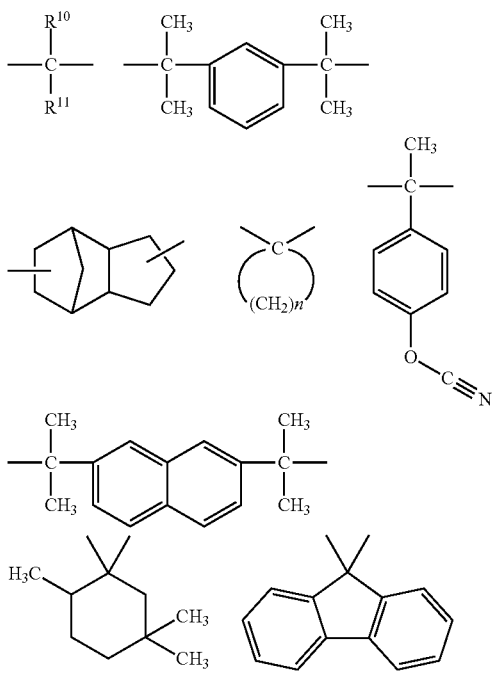

$R^{10}$ and $R^{11}$ in the above (3a) are each a hydrogen atom, or an unsubstituted or fluorine-substituted methyl group independently, and n is an integer of 4-12.

Examples of preferable compounds as the component (A) are 4,4'-ethylidenebisphenylenecyanate, 2,2-bis(4-cyanatephenyl) propane, bis(4-cyanate-3,5-dimethylphenyl) methane and prepolymers thereof.

These cyanate ester resins used as the component (A) in the present invention may be used alone, or two or more kinds of them may be used in combination.

Examples of epoxy resin of the component (B) used in the present invention are polyglycidyl ether compounds of mononuclear polyhydric phenol compounds such as hydroquinone, resorcin, pyrocatechol and phloroglucinol; polyglycidyl ether compounds of polynuclear polyhydric phenol compounds such as dihydroxy naphthalene, biphenol, methylene bisphenol (bisphenol F), methylene bis(orthocresol), ethylidene bisphenol, isopropylidene bisphenol (bisphenol A), isopropylidene bis(orthocresol), tetrabromo bisphenol A, 1,3-bis(4-hydroxy cumyl benzene), 1,4-bis(4-hydroxy cumyl benzene), 1,1,3-tris(4-hydroxyphenyl)buthane, 1,1,2,2-tetra(4-hydroxyphenyl)ethane, thiobisphenol, sulfobisphenol, oxybisphenol, phenolnovolac, orthocresolnovolac, ethylphenolnovolac, butylphenolnovolac, octylphenolnovolac, resorcinnovolac and terpenephenol; polyglycidyl ether compounds of polyhydric alcohols such as ethylene glycol, propylene glycol, butylene glycol, hexanediol, polyglycol, thiodiglycol, glycerine, trimethylol propane, pentaerythritol, sorbitol and bisphenol A-ethylene oxide addition products; glycidyl esters of aliphatic, aromatic or alicyclic polybasic acid such as maleic acid, fumaric acid, itaconic acid, succinic acid, glutaric acid, suberic acid, adipic acid, azelaic acid, sebacic acid, dimer acid, trimer acid, phthalic acid, isophthalic acid, terephthalic acid, trimellitic acid, trimesic acid, pyromellitic acid, tetrahydrophthalic acid, hexahydrophthalic acid and endomethylene tetrahydrophthalic acid, and homopolymer or copolymer of glycidyl methacrylate; epoxy compounds having glycidylamino groups such as N,N-diglycidyl aniline, bis(4-(N-methyl-N-glycidylamino)phenyl)methane and diglycidyl ortho-toluidine; epoxidized compounds of cyclic olefin compounds such as vinylcyclohexene diepoxide, dicyclopentanediene diepoxide, 3,4-epoxy cyclohexylmethyl-3,4-epoxycyclohexane carboxylate, 3,4-epoxy-6-methylcyclohexylmethyl-6-methylcyclohexane carboxylate and bis(3,4-epoxy-6-methylcyclohexylmethyl)adipate; epoxidized conjugated diene polymers such as epoxidized polybutadiene and epoxidized styrene-butadiene copolymer; a heterocyclic compound such as triglycidylisocyanurate. These epoxy resins may be internally cross-linked by prepolymers having isocyanate groups at the ends thereof or may be high-molecularized by compounds having polyhydric active hydrogen (polyhydric phenol, polyamine, carbonyl group-containing compound and polyphosphate ester etc.).

It is preferable that, as for the polyepoxy compound used as the component (B) in the present invention, the epoxy equivalent is 70~3,000, and in particular 90~2,000 is more preferable. Curing properties may decline if the epoxy equivalent is less than 70, and sufficient physical properties of coating may not be obtained if the epoxy equivalent is more than 3,000, which is not preferable.

As for the amount of the components (A) and (B) used in the cyanate-epoxy resin composition of the present invention, it is preferable that the component (B) is 1-10000 mass parts relative to 100 mass parts of the component (A), in particular 10-1000 mass parts is more preferable, and 20-500 mass parts is optimum.

The (a) modified amine used for the aforementioned (c) latent curing agent in the present invention is a modified amine, which is obtained by reacting (a-1) polyamine compound with (a-2) epoxy compound, having one or more amino groups having active hydrogen within a molecule. In the present invention, it is required in particular that the above (a-1) polyamine is a polyether polyamine compound, and/or the above (a-2) epoxy compound is polyether polyepoxy compound.

In cases where the above (a-1) polyamine in the above (c) latent curing agent used for the present invention is a polyether polyamine compound, it is preferable that the said compound is a polyamine compound selected from polyether polyamine represented by the following general formulae (0-1)-(0-3).

General formula (0-1):

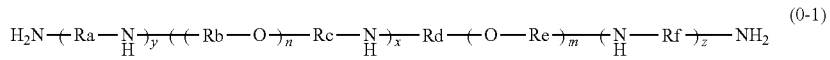

(0-1)

In the above general formula (0-1), n and m are a number of 1-50 respectively, x is a number of 0-5, y is 0 or 1, z is 0 or 1. Ra, Rb, Rc, Rd, Re and Rf represent each unsubstituted or fluorine-substituted bivalent hydrocarbon group having 1-10 carbon atoms independently. As for Re in cases where m is 2 or more, and Rb in cases where x is 1 or more and n is 2 or more, hydrocarbon groups having different numbers of carbon atoms may bind in the form of block or may be random.

General formula (0-2):

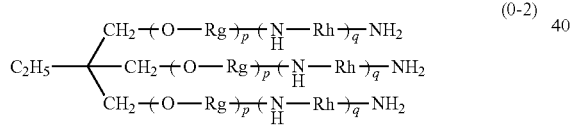

(0-2)

In the above general formula (0-2), p is a number of 1-50, q is 0 or 1, Rg and Rh represent each unsubstituted or fluorine-substituted bivalent hydrocarbon group having 1-10 carbon atoms independently. As for Rg in cases where p is 2 or more, hydrocarbon groups having different numbers of carbon atoms may be connected in the form of block or randomly.

General formula (0-3):

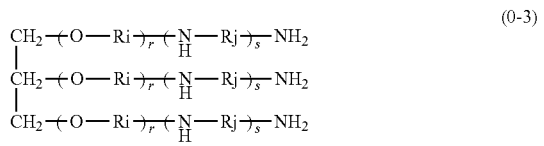

(0-3)

r is a number of 1-50, s is 0 or 1, Ri and Rj represent each unsubstituted or fluorine-substituted bivalent hydrocarbon group having 1-10 carbon atoms independently in the above general formula (0-3). As for Ri in cases where r is 2 or more, hydrocarbon groups having different numbers of carbon atoms may bind in the form of block or may be random.

Examples of unsubstituted or fluorine-substituted bivalent hydrocarbon group having 1-10 carbon atoms represented by Ra, Rb, Rc, Rd, Re and Rf in the aforementioned general formula (0-1), Rg and Rh in the aforementioned general formula (0-2), Ri and Rj in the above general formula (0-3) are methylene, ethylene, 1,2-propylene, 1,3-propylene, 1,2-butylene, 1,3-butylene, 1,4-butylene, 1,5-pentylene, 1,6-hexylene, 1,7-heptalene, 1,8-octylene, 1,9-nonylene, 1,10-decylene and trifluoromethylethylene.

Among these (a-1) polyether polyamines, the polyether polyamine compound is particularly preferable in the present invention, which is selected from (0-4) polyether polyamine compound wherein y and z are 0 in the aforementioned general formula (0-1), (0-5) polyether polyamine compound wherein q is 0 in the aforementioned general formula (0-2), and (0-6) polyether polyamine compound wherein s is 0 in the aforementioned general formula (0-3).

Namely, the above polyether polyamine compounds (0-1)-(0-5) are represented by the following general formulae.

General formula (0-4):

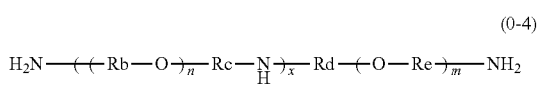

(0-4)

In the above general formula (0-4), n and m are a number of 1-50 respectively, x represents a number of 0-5, Rb, Rc, Rd and Re represent each unsubstituted or fluorine-substituted bivalent hydrocarbon group having 1-10 carbon atoms independently. Rb in cases where Re and n are 2 or more, may be a hydrocarbon group having different numbers of carbon atoms.

General formula (0-5):

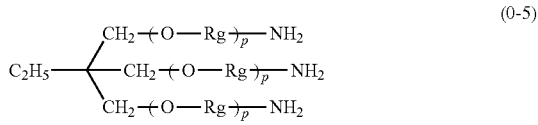

(0-5)

p represents a number of 1-50, and Rg represents unsubstituted or fluorine-substituted bivalent hydrocarbon group having 1-10 carbon atoms in the above general formula (0-5). Rg in cases where p is 2 or more, may be a hydrocarbon group having different numbers of carbon atoms.

General formula (0-6):

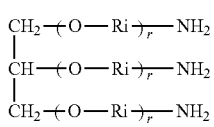  (0-6)

In the above general formula (0-6), r represents a number of 1-50, and Ri represents unsubstituted or fluorine-substituted bivalent hydrocarbon group having 1-10 carbon atoms. Ri in cases where r is 2 or more, may be a hydrocarbon group having different numbers of carbon atoms.

Examples of the aforementioned (a-1) polyamine compound in the present invention are aliphatic polyamines such as ethylenediamine, diethylene triamine, triethylenetetramine, tetraethylenepentamine, polyoxypropylenediamine and polyoxypropylenetriamine; alicyclic polyamines such as isoholondiamine, mensendiamine, bis(4-amino-3-methyldicyclohexyl)methane, diaminodicyclohexylmethane, bis(aminomethyl)cyclohexane, N-aminoethylpiperazine and 3,9-bis(3-aminopropyl)-2,4,8,10-tetraoxaspiro(5,5)undecane; mononuclear polyamines such as m-phenylenediamine, p-phenylenediamine, trilene-2,4-diamine, trilene-2,6-diamine, mesitylene-2,4-diamine, mesitylene-2,6-diamine, 3,5-diethyltrilene-2,4-diamine and 3,5-diethyltrilene-2,6-diamine; aromatic polyamines such as biphenylenediamine, 4,4-diaminodiphenylmethane, 2,5-naphthylenediamine and 2,6-naphthylenediamine; an imidazole such as 2-aminopropyl imidazole etc.

Specific examples of compounds represented by the aforementioned general formulae (0-1)-(0-3) and (0-4)-(0-6) are as follows.

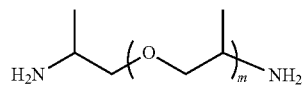

m=2.69: Jeffamine D230 (Commercial name: manufactured by BASF)

m=5.62: Jeffamine D400 (Commercial name: manufactured by BASF)

m=33.2: Jeffamine D2000 (Commercial name: manufactured by BASF)

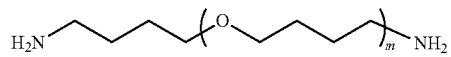

m=22.4: Polytetrahydrofuranamine 1700 (Commercial name: manufactured by BASF)

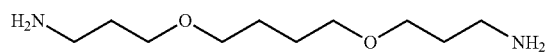

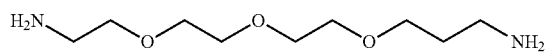

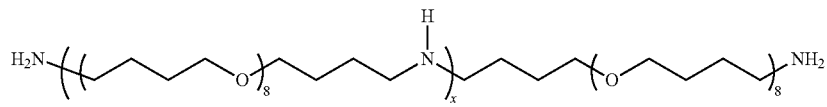

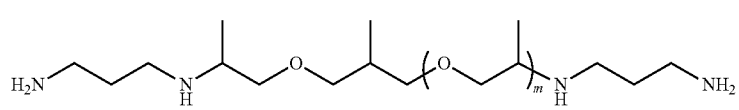

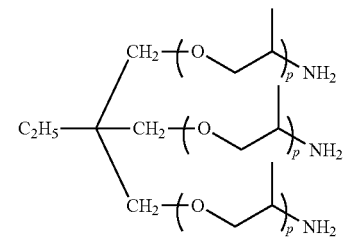

p(Total of three)=5.32: Jeffamine T-403 (Commercial name: manufactured by BASF)

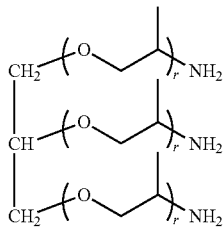

r(Total of three)=84.7: Jeffamine T-5000 (Commercial name: manufactured by BASF)

It is preferable that the aforementioned (a-2) epoxy compound used for the (c) latent curing agent in the present invention is a polyglycidyl ether compound having two or more epoxy groups within a molecule.

In the one liquid type cyanate ester-epoxy composite resin composition of the present invention, it is preferable that in cases where the aforementioned (a-2) epoxy compound is a polyether polyepoxy compound, the said polyether polyepoxy compound is a polyglycidyl polyether compound represented by the following general formula (0-7) having two epoxy groups within a molecule.

General formula (0-7)

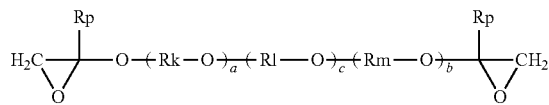

In the above general formula (0-7), a and b are a number of 1-20, c is 0 or 1, Rp is a hydrogen atom or a methyl group, Rk and Rm are unsubstituted or fluorine-substituted bivalent hydrocarbon groups having 1-10 carbon atoms and Rl is a group represented by any of the formulae of (0-7a). In cases where a and b are each 2 or more, bivalent hydrocarbon groups having different numbers of carbon atoms may bind in the form of block or may be random.

(0-7a)

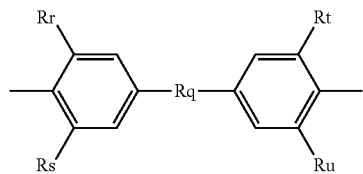

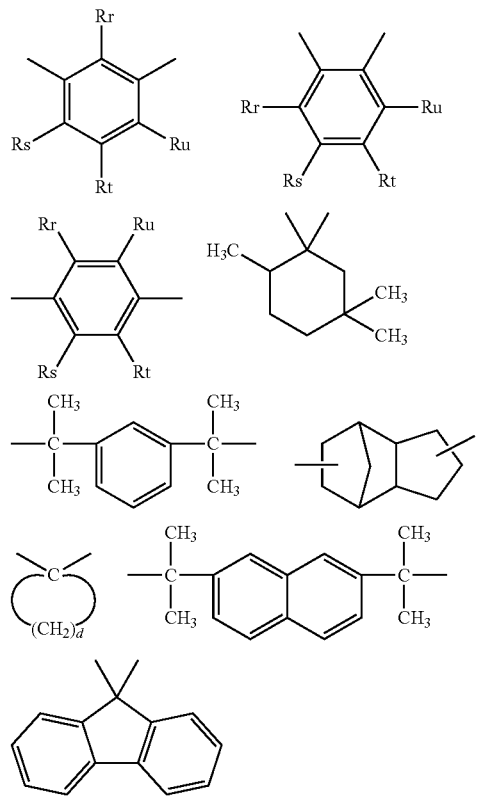

In the above formula (0-7a), Rr, Rs, Rt and Ru are each a hydrogen atom, or an unsubstituted or fluorine-substituted methyl group, d is an integer of 4-12, Rq is —O—, —S—, a single bond, or a group represented by the following general formula (0-7b).

General formula (0-7b)

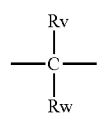

In the above general formula (0-7a), Rv and Rw are each a hydrogen atom, or an unsubstituted or fluorine-substituted alkyl group having 1-4 carbon atoms.

It is preferable that the aforementioned polyglycidyl polyether compound is the polyglycidyl polyether represented by the following general formula (0-8).

General formula (0-8)

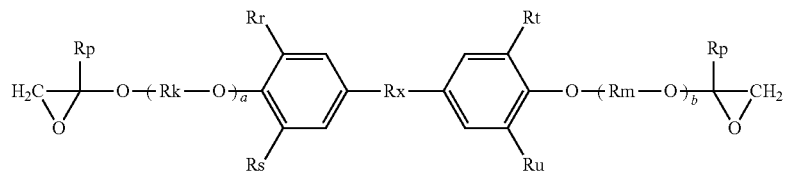

In the above formula (0-8), a and b are each a number of 1-20, Rp is a hydrogen atom or a methyl group, Rk and Rm are unsubstituted or fluorine-substituted bivalent hydrocarbon groups having 1-10 carbon atoms. Rr, Rs, Rt and Ru are each a hydrogen atom or an unsubstituted or fluorine-substituted methyl group independently. Rx is a group represented by the following general formula (0-8a). In cases where a and b are each 2 or more, bivalent hydrocarbon groups having different numbers of carbon atoms may bind in the form of block or may be random.

General formula (0-8a)

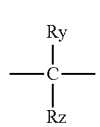

In the above general formula (0-8a), Ry and Rz are each independently a hydrogen atom or an alkyl group having 1-4 carbon atoms.

Examples of (a-2) epoxy compounds used for the latent curing agent (C) in the present invention are monoglycidyl ether compounds such as phenylglycidyl ether, allylglycidyl ether, methylglycidyl ether, butylglycidyl ether, secondary butylglycidyl ether, 2-ethylhexylglycidyl ether, 2-methyloctylglycidyl ether and stearylglycidyl ether; a monoglycidyl ester compound such as a versatic acid glycidyl ester; polyglycidyl ether compounds of mononuclear multivalent phenol compounds such as hydroquinone, resorcin, pyrocatechol and phloroglucinol; polyglycidyl ether compounds of polynuclear multivalent phenol compounds such as dihydroxy naphthalene, biphenol, methylenebisphenol(bisphenol F), methylenebis(orthocresol), ethylidene bisphenol, isopropylidene bisphenol (bisphenol A), isopropylidenebis(orthocresol), tetrabromo bisphenol A, 1,3-bis(4-hydroxy cumylbenzene), 1,4-bis(4-hydroxy cumylbenzene), 1,1,3-tris(4-hydroxyphenyl)butane, 1,1,2,2-tetra(4-hydroxyphenyl) ethane, thiobisphenol, sulfobisphenol, oxybisphenol, phenol novolac, orthocresol novolac, ethylphenolnovolac, butylphenol novolac, octylphenol novolac, resorcin novolac and terpenephenol; polyglycidyl ether compounds of polyalcohols such as ethylene glycol, propylene glycol, butylene glycol, hexanediol, polyglycol, thiodiglycol, glycerine, trimethylol propane, pentaerythritol, sorbitol and bisphenol A-ethylene oxide addition products; glycidyl esters of aliphatic, aromatic or alicyclic polybasic acids such as maleic acid, fumaric acid, itaconic acid, succinic acid, glutaric acid, suberic acid, adipic acid, azelaic acid, sebacic acid, dimer acid, trimer acid, phthalic acid, isophthalic acid, terephthalic acid, trimellitic acid, trimesin acid, pyromellitic acid, tetrahydrophthalic acid, hexahydrophthalic acid, endomethylene tetrahydrophthalic acid and homopolymers or copolymers of glycidylmethacrylates; epoxy compounds having glycidylamino groups such as N,N-diglycidyl aniline, bis(4-(N-methyl-N-glycidylamino)phenyl)methane and diglycidyl orthotoluidine; epoxidized compounds of cyclic olefin compounds such as vinylcyclohexenediepoxide, dicyclopentanedienediepoxide, 3,4-epoxycyclohexylmethyl-3,4-epoxycyclohexanecarboxylate, 3,4-epoxy-6-methylcyclohexylmethyl-6-methylcyclohexanecarboxylate and bis(3,4-epoxy-6-methylcyclohexylmethyl)adipate; epoxidized conjugated diene polymers such as epoxidized polybutadiene and epoxidized styrene-butadiene copolymer; and a heterocyclic compound such as triglycidylisocyanurate.

Examples of the general formulae (0-7) and (0-8) used as the above (a-2) epoxy compound are as follows.

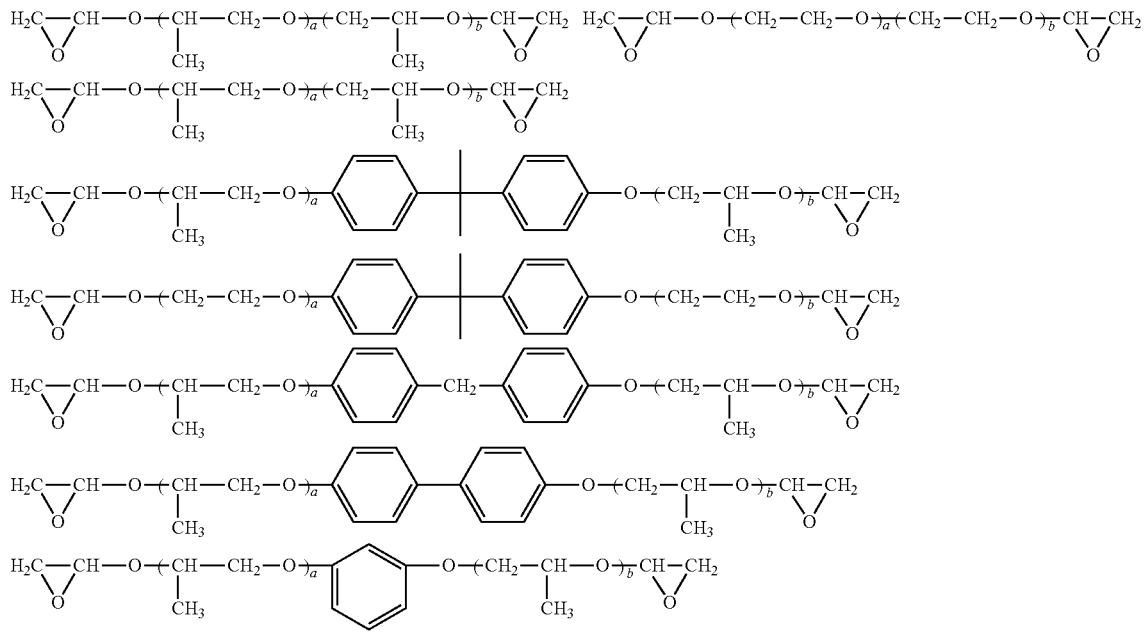

In the cyanate ester-epoxy composite resin composition of the present invention, it is preferable that the aforementioned (a) modified polyamine compound is a modified polyamine obtained by reacting 0.5-2 epoxy equivalent of the above (a-2) epoxy compound with 1 mol of the above (a-1) polyamine compound. In particular, a modified polyamine obtained by the reaction using 0.8-1.5 equivalent of the (a-2) epoxy compound is preferable.

The (b) phenol resins used in the present invention are resins synthesized from phenols and aldehydes. Examples of the above phenols are, for example, phenol, cresol, ethylphenol, n-propylphenol, isopropylphenol, butylphenol, tertiary-butylphenol, octylphenol, nonylphenol, dodecylphenol, cyclohexylphenol, chlorophenol, bromophenol, resorcin, catechol, hydroquinone, 2,2-bis(4-hydroxyphenyl)propane, 4,4'-thiodiphenol, dihydroxydiphenylmethane, naphthol, terpenephenol and phenolized di cyclopentadiene. An example of the above aldehydes is formaldehyde.

It is preferable that a number average molecular weight of the (b) phenol resin in the present invention is 750~1,200 from a viewpoint of obtaining a well-balanced composition between storage stability and curing properties.

It is preferable that the amount of the above (b) phenol resin used is 10~150 mass parts relative to 100 mass parts of the (a) modified polyamine, in particular 20~60 mass parts is more preferable. If it is less than 10 mass parts, a composition having sufficient stability cannot be obtained. If it exceeds 100 mass parts, the curing properties are insufficient.

The latent curing agent used as the component (C) in the present invention may be surface-treated by well-known methods or master-batched.

The amount of the component (C) used in the cyanate ester-epoxy resin composition of the present invention is preferably 1~100 mass parts relative to 100 mass parts of the total amount of components (A) and (B). In particular, 5~60 mass parts is preferable.

The cyanate ester-epoxy resin composition of the present invention can be used by dissolving it in a various types of solvent, so that its treatment becomes easy. Examples of these solvents are ethers such as tetrahydrofuran, 1,2-dimethoxyethane and 1,2-diethoxyethane; alcohols such as iso- or n-butanol, iso- or n-propanol, amyl alcohol, benzyl alcohol, furfuryl alcohol and tetrahydrofurfuryl alcohol; ketones such as methyethylketone, methylisopropylketone and methylbutylketone; aromatic hydrocarbons such as benzen, toluene and xylene; triethylamine, pyridine, dioxane, and acetonitrile etc.

Since the above organic solvents are harmful as well as dangerous due to volatilization, the amount used should not exceed 200 mass parts relative to the total amount of 100 mass parts of the components (A), (B) and (C). In the present invention, it is preferable to use 0~40 mass parts of organic solvent relative to the total amount of 100 mass parts of the components (A), (B) and (C). In particular, it is preferable to use 0~20 mass parts.

The cyanate ester-epoxy resin composition of the present invention may contain fillers or pigments such as glass fiber, carbon fiber, cellulose, siliceous sand, cement, kaolin, clay, aluminum hydroxide, bentonite, talk, silica, fine powder silica, titanium dioxide, carbon black, graphite, iron oxide, bituminous substance, matallic particle and resin particle coated with metal; thickners; thixotropic agents; flame retardants; defoamers; fungus resistance agents; commonly used additives such as colloidal silica and colloidal alumina, if necessary. In addition, sticky resins such as xylene resin and petroleum resin may be used together.

It is preferable to contain 50 mass % or more of the total amount of the components (A), (B) and (C) in the cyanate ester-epoxy resin composition of the present invention.

The cyanate ester-epoxy resin composition of the present invention can be widely used for coating compositions against concrete, cement, mortar, various metals, leather, glass, rubber, plastic, wood, cloth, paper etc., or for adhesive agents. In particular, since cured materials have high thermal resistance and excellent adhesive properties, they are suitably used for sealing materials to protect semiconductors, electronic materials to bond electronic parts etc. and automobile materials.

One liquid type cyanate-epoxy composite resin composition of the present invention will now be described in more detail referring to manufacturing examples and examples of the latent curing agent, but the invention is not limited by these descriptions.

Manufacturing Example 1

Manufacture of Latent Curing Agent (EH-1)

230 g of JFFAMINE D230 (Commercial name of the product manufactured by HUNTSMAN CORPORATION; Polyether Polyamine) was introduced into a flask and heated to 60° C., then 190 g of ADEKA RESIN EP-4901E (Commercial name of the product manufactured by ADEKA CORPORATION; it is a bisphenol F type epoxy resin, and its epoxy equivalent is 170.) was added little by little in order to keep the temperature within the system at 100~110° C. After all of the ADEKA RESIN EP-4901E was added, the temperature of the reaction system was risen to 140° C., the reaction was carried out for 1.5 hours to obtain the modified polyamine. Then, 50 g of phenol resin was introduced into 100 g of the modified polyamine obtained, desolvation was carried out for an hour under the condition of 180~190° C. and 30~40 torr to obtain the latent curing agent (EH-1).

Manufacturing Example 2

Manufacture of Latent Curing Agent (EH-2)

Using 400 g of JFFAMINE T403 (Commercial name of the product manufactured by HUNTSMAN CORPORATION; Polyether Polyamine) and 190 g of ADEKA RESIN EP-4901E (Commercial name of the product manufactured by ADEKA CORPORATION; it is a bisphenol F type epoxy resin, and its epoxy equivalent is 170.), the modified polyamine was obtained by carrying out the reaction in the similar way as manufacturing example 1. Then, 50 g of phenol resin was introduced into 100 g of the modified polyamine obtained, desolvation was carried out for an hour under the condition of 180~190° C. and 30~40 torr to obtain the latent curing agent (EH-2).

Manufacturing Example 3

Manufacture of Latent Curing Agent (EH-3)

Using 100 g of xylylenediamine and 213 g of ADEKA RESIN EP-4100E (Commercial name of the product manufactured by ADEKA CORPORATION; it is a bisphenol A type epoxy resin, and its epoxy equivalent is 190.), the modified polyamine was obtained by carrying out the reaction in the similar way as manufacturing example 1. Then, 30 g of phenol resin was introduced into 100 g of the modified polyamine obtained, desolvation was carried out for an hour under the condition of 180~190° C. and 30~40 torr to obtain the latent curing agent (EH-3).

Manufacturing Example 4

Manufacture of Latent Curing Agent (EH-4)

Except that, JFFAMINE D230 used in the above manufacturing example 1 was replaced with 100 g of N,N-diethylaminopropylamine, and it was reacted with 213 g of ADEKA RESIN EP-4100E (Commercial name of the product manufactured by ADEKA CORPORATION; it is a bisphenol A type epoxy resin and its epoxy equivalent is 190), the modified polyamine was obtained by carrying out the reaction in the similar way as manufacturing example 1. Then, 30 g of phenol resin was introduced into 100 g of the modified polyamine obtained, desolvation was carried out for an hour under the condition of 180~190° C. and 30~40 torr to obtain the latent curing agent (EH-4).

Example 1 and Comparative Example 1

Cyanate ester resin (Cyanate LeCy: Commercial name of the product manufactured by Lonza Co.: it is represented as CE in the Tables), epoxy resin (EP-4901E: Commercial name of the product manufactured by ADEKA CORPORATION: it is a bisphenol F type epoxy resin and its epoxy equivalent is 168: it is represented as EP in the Tables.) and the latent curing agent obtained by the above manufacturing examples were blended as shown in the after-mentioned Table 1 to carry out the following tests on the obtained resin composition.

1. Storage Stability

Initial viscosity and viscosity after 24 hours under 25° C. were measured by using Brookfield E type rotation viscometer under the conditions of 5 rpm at 25° C. The storage stability was evaluated from the increase of the viscosity.

2. Curing Properties 0.5 g of the composition obtained was dropped on a hot plate, wherein each measured temperature was maintained. While mixing with a spatula etc., the time until the fluidity of the composition disappeared (gel time) was measured to evaluate curing properties.

3. Thermal Resistance

DSC measurement was carried out under the conditions where the temperature rising speed is 10° C./minute and the scanning temperature range is 25-300° C., by using the differential scanning calorimeter DSC 6220 manufactured by SII Nano Technology Inc.

Then the secondary temperature rising was carried out under the same conditions, and the glass transition point (Tg) was measured from an inflection point of heat capacity to evaluate the thermal resistance.

4. Adhesive Properties

According to JIS K 6850, shear adhesive strength of steel plate/steel plate was measured after curing for 1 hour at 120° C. to evaluate adhesive properties.

TABLE 1

|  | Examples | | Comparative examples | | | |
| --- | --- | --- | --- | --- | --- | --- |
|  | 1-1 | 1-2 | 1-1 | 1-2 | 1-3 | 1-4 |
| Composition(mass parts) | | | | | | |
| CE | 50 | 50 | 0 | 0 | 50 | 50 |
| EP | 50 | 50 | 100 | 100 | 50 | 50 |
| EH-1 | 50 | | 50 | | | |
| EH-2 | | 50 | | 50 | | |
| EH-3 | | | | | 50 | |
| EH-4 | | | | | | 40 |
| Evaluation results Viscosity | | | | | | |
| Initial viscosity (mPa·s) | 8800 | 9200 | 18500 | 19600 | 8400 | 3500 |
| Viscosity increase ratio (%) | | | | | | |
| After 25° C. × 24 hours | 101 | 103 | gel | gel | 104 | 109 |

TABLE 2

|  | Examples | | Comparative examples | | | |
| --- | --- | --- | --- | --- | --- | --- |
|  | 1-1 | 1-2 | 1-1 | 1-2 | 1-3 | 1-4 |
| Composition(mass parts) | | | | | | |
| CE | 50 | 50 | 0 | 0 | 50 | 50 |
| EP | 50 | 50 | 100 | 100 | 50 | 50 |
| EH-1 | 50 | | 50 | | | |
| EH-2 | | 50 | | 50 | | |
| EH-3 | | | | | 50 | |
| EH-4 | | | | | | 40 |
| Evaluation results Gel time | | | | | | |
| 70° C. | 15 sec. | 25 sec. | >900 sec. | >900 sec. | >900 sec. | >900 sec. |
| 80° C. | 11 sec. | 13 sec. | 630 sec. | 770 sec. | >900 sec. | 21 sec. |
| 100° C. | 6 sec. | 10 sec. | 195 sec. | 155 sec. | 15 sec. | 15 sec. |
| 120° C. | 5 sec. | 7 sec. | 35 sec. | 30 sec. | 13 sec. | 11 sec. |
| Glass transition point | | | | | | |
| Tg(° C.) | 98.1 | 97.5 | 62.2 | 74.5 | 103.2 | 101.7 |

TABLE 3

|  | Examples | | Comparative examples | | | |
| --- | --- | --- | --- | --- | --- | --- |
|  | 1-1 | 1-2 | 1-1 | 1-2 | 1-3 | 1-4 |
| Composition(mass parts) | | | | | | |
| CE | 50 | 50 | 0 | 0 | 50 | 50 |
| EP | 50 | 50 | 100 | 100 | 50 | 50 |
| EH-1 | 50 | | 50 | | | |
| EH-2 | | 50 | | 50 | | |

TABLE 3-continued

|  | Examples | | Comparative examples | | | |
|---|---|---|---|---|---|---|
|  | 1-1 | 1-2 | 1-1 | 1-2 | 1-3 | 1-4 |
| EH-3 |  |  |  |  | 50 |  |
| EH-4 |  |  |  |  |  | 40 |
| Evaluation results |  |  |  |  |  |  |
| Shear adhesive strength: 23° C. (MPa) | 12.0 | 11.7 | 8.9 | 8.7 | 14.3 | 12.7 |

As is clear from the results of the above Tables 1 and 2, it was confirmed that, since the resin compositions using the latent curing agent wherein epoxy resin alone has active hydrogen (Comparative examples 1-1 and 1-2) has higher viscosity increase ratio, lower Tg and also abnormally longer gel time at low temperature than the one liquid type cyanate ester-epoxy composite resin composition of the present invention (Examples 1-1 and 1-2), they were poorer in storage stability, thermal resistance and curing properties at low temperature.

In addition, as is clear from Table 3, the resin compositions of the above Comparative examples 1-1 and 1-2 were also poorer in adhesive strength.

Furthermore, both the one liquid type cyanate ester-epoxy composite resin composition of the present invention (Examples 1-1 and 1-2) wherein epoxy resin was combined with cyanate ester resin, and the resin compositions of Comparative examples 1-3 and 1-4 show improvements of storage stability and thermal resistance as well as high adhesive properties. However, in the case of the resin compositions of Comparative examples 1-3 and 1-4 using a latent curing agent which does not have an ether group, it was confirmed that the gel time was longer and curing properties were poorer at low temperature.

On the contrary, in the case of the one liquid type cyanate ester-epoxy composite resin composition of the present invention (Examples 1-1 and 1-2) wherein epoxy resin was combined with cyanate ester resin and a latent curing agent having an ether group is used, it was confirmed that not only adhesive properties and thermal resistance were excellent, but also storage stability and curing properties at low temperature were excellent.

Manufacturing Example 5

Manufacture of Latent Curing Agent (EH-5)

201 g of 1,2 diaminopropane was introduced into a flask and heated to 60° C., then 900 g of ADEKA RESIN EP-40005 (Commercial name of the product manufactured by ADEKA CORPORATION; it is a propylene oxide-modified bisphenol A type epoxy resin, and its epoxy equivalent is 260.) was added little by little in order to keep the temperature within the system at 100~110° C. After all of the ADEKA RESIN EP-40005 was added, the temperature of the reaction system was risen to 140° C., the reaction was carried out for 1.5 hours to obtain the modified polyamine. Then, 70 g of phenol resin was introduced into 100 g of the modified polyamine obtained, desolvation was carried out for an hour under the condition of 180~190° C. and 30~40 torr to obtain the latent curing agent (EH-5).

Manufacturing Example 6

Manufacture of Latent Curing Agent (EH-6)

201 g of 1,2 diaminopropane was introduced into a flask and heated to 60° C., then 580 g of ADEKA RESIN EP-4100E (Commercial name of the product manufactured by ADEKA CORPORATION; it is a bisphenol A type epoxy resin, and its epoxy equivalent is 190.) was added little by little in order to keep the temperature within the system at 100~110° C. After all of the ADEKA RESIN EP-4100E was added, the temperature of the reaction system was risen to 140° C., the reaction was carried out for 1.5 hours to obtain the modified polyamine. Then, 30 g of phenol resin was introduced into 100 g of the modified polyamine obtained, desolvation was carried out for an hour under the condition of 180~190° C. and 30~40 torr to obtain the latent curing agent (EH-6).

Example 2 and Comparative Example 2

Cyanate ester resin (Cyanate LeCy: Commercial name of the product manufactured by Lonza Co.: it is represented as CE in the Tables), epoxy resin (EP-4901E: Commercial name of the product manufactured by ADEKA CORPORATION: it is a bisphenol F type epoxy resin and its epoxy equivalent is 168: it is represented as EP in the Tables.) and the latent curing agent obtained by the above manufacturing examples were blended, and in the same way as Example 1, the tests on the obtained resin composition were carried out.

TABLE 4

|  | Examples | | Comparative examples | | | |
|---|---|---|---|---|---|---|
|  | 2-1 | 2-2 | 2-1 | 2-2 | 2-3 | 2-4 |
| Composition(mass parts) |  |  |  |  |  |  |
| CE | 50 | 50 | 0 | 0 | 50 | 50 |
| EP | 50 | 50 | 100 | 100 | 50 | 50 |
| EH-5 | 27.5 | 55 | 55 |  |  |  |
| EH-6 |  |  |  | 55 | 55 | 27.5 |
| Evaluation results Viscosity |  |  |  |  |  |  |
| Initial viscosity (mPa · s) | 1020 | 4500 | 19500 | 17200 | 8550 | 980 |
| Viscosity increase ratio (%) |  |  |  |  |  |  |
| After 25° C. × 24 hours | 100 | 101 | gel | 141 | 101 | 100 |

TABLE 5

|  | Examples | | Comparative examples | | | |
|---|---|---|---|---|---|---|
|  | 2-1 | 2-2 | 2-1 | 2-2 | 2-3 | 2-4 |
| Composition(mass parts) |  |  |  |  |  |  |
| CE | 50 | 50 | 0 | 0 | 50 | 50 |
| EP | 50 | 50 | 100 | 100 | 50 | 50 |

TABLE 5-continued

|  | Examples | | Comparative examples | | | |
|---|---|---|---|---|---|---|
|  | 2-1 | 2-2 | 2-1 | 2-2 | 2-3 | 2-4 |
| EH-5 | 27.5 | 55 | 55 | | | |
| EH-6 | | | | 55 | 55 | 27.5 |
| Evaluation results | | | | | | |
| Gel time | | | | | | |
| 70° C. | 50 sec. | 30 sec. | >900 sec. | >900 sec. | >900 sec. | >900 sec. |
| 80° C. | 15 sec. | 10 sec. | 540 sec. | 210 sec. | >900 sec. | >900 sec. |
| 100° C. | 11 sec. | 8 sec. | 185 sec. | 85 sec. | 13 sec. | 16 sec. |
| 120° C. | 9 sec. | 7 sec. | 83 sec. | 59 sec. | 10 sec. | 14 sec. |
| Glass transition point | | | | | | |
| Tg(° C.) | 105.4 | 97.2 | 62.2 | 56.9 | 105.2 | 117.4 |

TABLE 6

|  | Examples | | Comparative examples | | | |
|---|---|---|---|---|---|---|
|  | 2-1 | 2-2 | 2-1 | 2-2 | 2-3 | 2-4 |
| Composition(mass parts) | | | | | | |
| CE | 50 | 50 | 0 | 0 | 50 | 50 |
| EP | 50 | 50 | 100 | 100 | 50 | 50 |
| EH-5 | 27.5 | 55 | 55 | | | |
| EH-6 | | | | 55 | 55 | 27.5 |
| Evaluation results | | | | | | |
| Shear adhesive strength 23° C. (MPa) | 11.0 | 12.1 | 12.5 | 13.7 | 15.5 | 14.1 |

As is clear from the results of the above Tables 4 and 5, it was confirmed that, since the resin compositions using the latent curing agent wherein epoxy resin alone has active hydrogen (Comparative examples 2-1 and 2-2) has higher viscosity increase ratio, lower Tg and also abnormally longer gel time at low temperature than the one liquid type cyanate ester-epoxy composite resin composition of the present invention (Examples 2-1 and 2-2), they were poorer in storage stability, thermal resistance and curing properties at low temperature.

In addition, the one liquid type cyanate ester-epoxy composite resin composition of the present invention (Examples 2-1 and 2-2) wherein epoxy resin was combined with cyanate ester resin and the resin composition of Comparative examples 2-3 and 2-4 are excellent in adhesive properties and show an improvement of thermal resistance. However, in the case of the resin composition of Comparative examples 2-3 and 2-4 using a latent curing agent which does not have an ether group, it was confirmed that the gel time was abnormally longer and curing properties were poorer at low temperature.

On the other hand, it was confirmed that the present invention (Examples 2-1 and 2-2) wherein epoxy resin was combined with cyanate ester resin and a latent curing agent having an ether group is used was excellent not only in adhesive properties and thermal resistance, but also in storage stability and further in curing properties and adhesive properties at low temperature.

INDUSTRIAL APPLICABILITY

The cyanate ester-epoxy composite resin composition of the present invention has not only excellent storage stability but also excellent low temperature curing properties and thermal resistance. Therefore, it can be widely used for a coating composition against concrete, cement, mortar, various types of metal, leather, glass, rubber, plastic, wood, cloth and paper etc., or for an adhesive agent. In particular, since cured materials have high thermal resistance and excellent adhesive properties, they are suitably used for sealing materials to protect semiconductors, electronic materials to bond electronic parts etc. and furthermore automobile materials.

What is claimed is:
1. A liquid cyanate ester-epoxy composite resin composition, comprising:
   (A) cyanate ester resin,
   (B) epoxy resin, and
   C) latent curing agent,
   wherein the amount of the component (B) is 1-10000 mass parts relative to 100 mass parts of the component (A), and the amount of component (C) is 5-60 mass parts relative to 100 mass parts of the total amount of components (A) and (B),
   wherein said latent curing agent (C) comprises a modified amine (a), which has one or more amino groups having active hydrogen within a molecule, obtained by a reaction of a polyamine compound (a-1) with an epoxy compound (a-2), and a phenol resin (b), and
   wherein said polyamine compound (a-1) is at least one polyether polyamine compound selected from polyether polyamines represented by the following formulae (0-1)-(0-2):

formula (0-1)

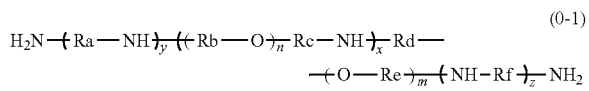

wherein
   n and m are each, independently, a number of 1-50,
   x is a number of 0-5,
   y is 0 or 1,
   z is 0 or 1, and
   Ra, Rb, Rc, Rd, Re and Rf are each, independently, an unsubstituted or fluorine-substituted bivalent hydrocarbon group having 1-10 carbon atoms,
   in cases where m is 2 or more, each of the Re hydrocarbon groups optionally have the same or different numbers of carbon atoms and the —O-Re- groups having different numbers of carbon atoms are optionally in the form of blocks or are optionally random, and in cases where x is 1 or more and n is 2 or more, each of the Rb hydrocarbon groups optionally have the same or different numbers of carbon atoms and -Rb-O— groups having different numbers of carbon atoms are optionally in the form of blocks or are optionally random, formula (0-2)

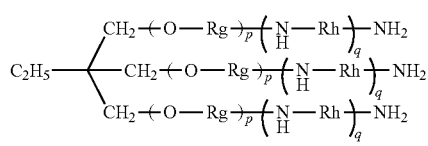

(0-2)

wherein
p is a number of 1-50,
q is 0 or 1, and
Rg and Rh are each, independently, an unsubstituted or fluorine-substituted bivalent hydrocarbon group having 1-10 carbon atoms,
in cases where p is 2 or more, each of the Rg hydrocarbon groups optionally have the same or different numbers of carbon atoms and the —O-Rg- groups having different numbers of carbon atoms are optionally in the form of blocks or are optionally random;
and/or
said epoxy compound (a-2) is a polyglycidyl polyether compound having two epoxy groups within a molecule, represented by the following formula (0-7)

formula (0-7)

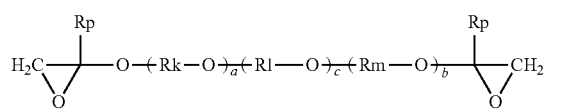

wherein
a and b are each, independently, a number of 1-20,
c is 0 or 1,
Rp is a hydrogen atom or a methyl group,
Rk and Rm are each, independently, an unsubstituted or fluorine-substituted bivalent hydrocarbon group having 1-10 carbon atoms, and
Rl is a group represented by any of the following formulae:

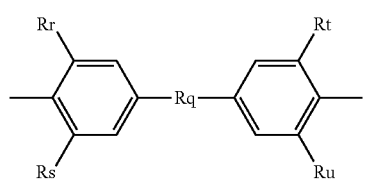

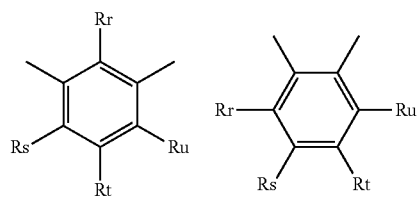

-continued

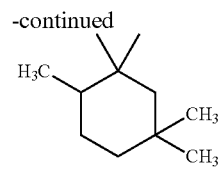

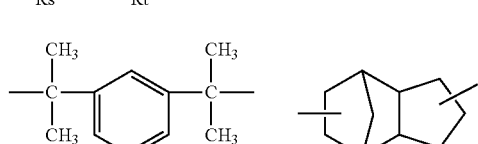

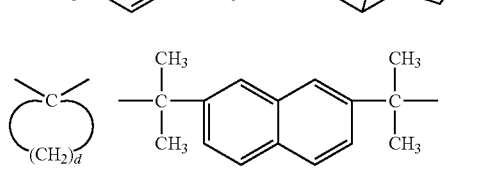

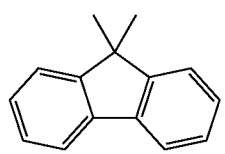

wherein
Rr, Rs, Rt and Ru are each, independently, a hydrogen atom, or an unsubstituted or fluorine-substituted methyl group,
d is an integer of 4-12,
Rq is —O—, —S—, a single bond or a group represented by formula (0-7b)

formula (0-7b)

wherein
Rv and Rw are each, independently, a hydrogen atom, or an unsubstituted or fluorine-substituted alkyl group having 1-4 carbon atoms.

2. A liquid cyanate ester-epoxy composite resin composition according to claim 1, wherein said polyether polyamine compound is a polyether polyamine compound selected from: a polyether polyamine compound of formula (0-1) wherein y and z are 0, and a polyether polyamine compound of formula (0-2) wherein q is 0.

3. A liquid cyanate ester-epoxy composite resin composition according to claim 2, wherein the amount of component (C) is 27.5-55 mass parts relative to 100 mass parts of the total amount of components (A) and (B), and wherein said epoxy compound (a-2) is a polyglycidyl polyether compound of formula (0-7).

4. A liquid cyanate ester-epoxy composite resin composition according to claim 1, wherein said polyglycidyl polyether compound is a polyglycidyl polyether compound represented by the following formula (0-8)

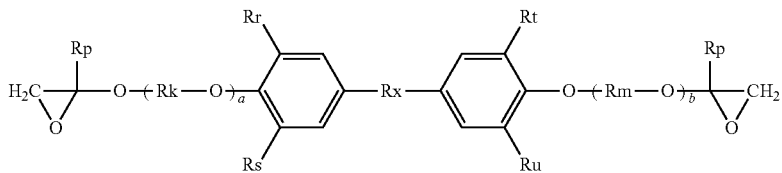

formula (0-8)

wherein
  a and b are each, independently, a number of 1-20,
  Rp is a hydrogen atom or a methyl group,
  Rk and Rm are each, independently, an unsubstituted or fluorine-substituted bivalent hydrocarbon group having 1-10 carbon atoms, and, in cases where a and b are each 2 or more, each of the Rk and Rm hydrocarbon groups optionally have the same or different numbers of carbon atoms and -Rk-O— and -Rm-O— groups having different numbers of carbon atoms are optionally in the form of blocks or are optionally random,
  Rr, Rs, Rt and Ru are each, independently, a hydrogen atom or an unsubstituted or fluorine-substituted methyl group, and
  Rx is a group represented by the following formula (0-8a)

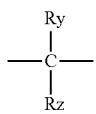

formula (0-8)

wherein
  Ry and Rz are each, independently, a hydrogen atom or an alkyl group having 1-4 carbon atoms.

5. A liquid cyanate ester-epoxy composite resin composition according to claim 1, wherein said modified amine (a) is a modified polyamine obtained by reacting said epoxy compound (a-2) with 1 mol of said polyamine compound (a-1).

6. A liquid cyanate ester-epoxy composite resin composition according to claim 1, wherein the number average molecular weight of said phenol resin (b) is 750-1200.

7. A liquid cyanate ester-epoxy composite resin composition according to claim 1, wherein 10-150 mass parts of said phenol resin (b) is used relative to 100 mass parts of said modified amine (a).

8. A liquid cyanate ester-epoxy composite resin composition according to claim 1, wherein 10-1000 mass parts of said (B) epoxy resin is used relative to 100 mass parts of said (A) cyanate ester resin.

9. A liquid cyanate ester-epoxy composite resin composition according to claim 1, wherein said (A) cyanate ester resin is one or more resins selected from a group consisting of the compounds represented by the following formula (1) or formula (2), and prepolymers thereof:

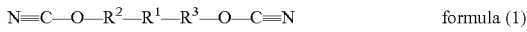

formula (1)

wherein
  $R^1$ is an unsubstituted or fluorine-substituted bivalent hydrocarbon group, or represents —O—, —S—, or a single bond, and
  $R^2$ and $R^3$ are each, independently, an unsubstituted phenylene group or a phenylene group substituted by 1-4 alkyl groups;

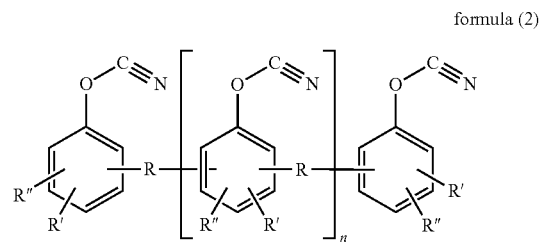

formula (2)

wherein
  n is a number of 1 or more,
  R is an unsubstituted or fluorine-substituted bivalent hydrocarbon group, and
  R' and R" are each, independently, a hydrogen atom or an alkyl group having 1-4 carbon atoms.

10. A liquid cyanate ester-epoxy composite resin composition according to claim 1, wherein said (A) cyanate ester resin is one or more resins selected from a group consisting of compounds represented by the following formula (3), and prepolymers thereof

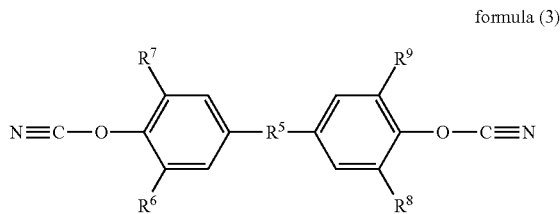

formula (3)

wherein
  $R^6$, $R^7$, $R^8$ and $R^9$ are each, independently, a hydrogen atom or an unsubstituted or fluorine-substituted methyl group, and
  $R^5$ is —O—, —S—, a single bond or a group represented by any of the following formulas

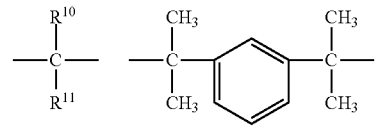

-continued

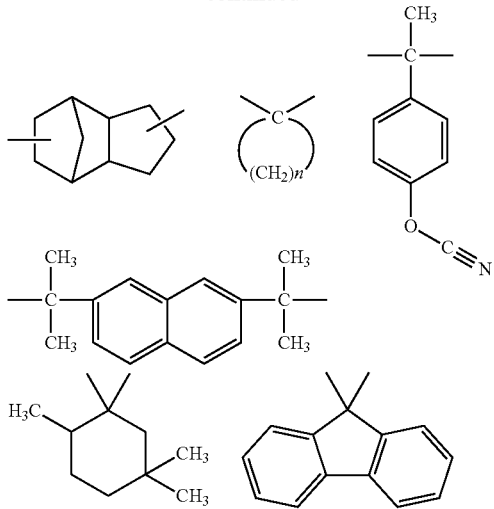

wherein
R¹⁰ and R¹¹ are each, independently, a hydrogen atom, or an unsubstituted or fluorine-substituted methyl group, and
n is an integer of 4-12.

11. A cured material comprising a cyanate ester-epoxy composite resin composition according to claim 1 which is polymerization-cured.

12. A sealing material comprising a cyanate ester-epoxy composite resin composition according to claim 1.

13. An adhesive agent comprising a cyanate ester-epoxy composite resin composition according to claim 1.

14. A method for manufacturing a cured material, said method comprising curing a cyanate ester-epoxy composite resin composition according to claim 1 in a mold.

15. A liquid cyanate ester-epoxy composite resin composition according to claim 1, wherein the amount of component (B) is 20-500 mass parts relative to 100 mass parts of component (A).

16. A liquid cyanate ester-epoxy composite resin composition according to claim 1, wherein the amount of the component (C) is 27.5-60 mass parts relative to 100 mass parts of the total amount of components (A) and (B).

17. A liquid cyanate ester-epoxy composite resin composition according to claim 1, wherein the amount of component (C) is 27.5-55 mass parts relative to 100 mass parts of the total amount of components (A) and (B), and wherein said epoxy compound (a-2) is a polyglycidyl polyether compound of formula (0-7).

* * * * *